United States Patent
Sharma et al.

(10) Patent No.: US 10,206,131 B2
(45) Date of Patent: Feb. 12, 2019

(54) SYSTEM AND METHOD FOR PROGRAMMABLE NATIVE ANALYTICS IN 5G MOBILE NETWORKS

(71) Applicant: ALCATEL-LUCENT, Boulogne-Billancourt (FR)

(72) Inventors: Sameerkumar Sharma, Holmdel, NJ (US); Edward Grinshpun, Freehold, NJ (US); Vijay K. Gurbani, Lisle, IL (US); David Faucher, Guthrie Center, IA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/262,620

(22) Filed: Sep. 12, 2016

(65) Prior Publication Data

US 2018/0077590 A1 Mar. 15, 2018

(51) Int. Cl.
*H04W 24/08* (2009.01)
*H04L 12/24* (2006.01)
*H04L 12/26* (2006.01)
*H04W 84/04* (2009.01)

(52) U.S. Cl.
CPC .......... *H04W 24/08* (2013.01); *H04L 41/14* (2013.01); *H04L 43/02* (2013.01); *H04L 43/14* (2013.01); *H04W 84/04* (2013.01)

(58) Field of Classification Search
CPC ......... H04L 47/14; H04L 43/02; H04L 43/14; H04W 24/08; H04W 24/02; H04W 28/0268; H04W 24/00; H04W 28/021; H04W 28/0215; H04W 28/0221; H04W 28/0247; H04W 28/0257; H04W 28/0284; H04W 28/0289; H04W 28/12; H04W 28/20; H04W 24/06; H04W 24/10; H04W 84/04
See application file for complete search history.

(56) References Cited

U.S. PATENT DOCUMENTS 6,971,063 B1 * 11/2005 Rappaport ............ H04L 41/145
  709/203
9,474,064 B2    10/2016 Sayeed
  (Continued)

FOREIGN PATENT DOCUMENTS

WO    2016/095943 A1    6/2016

OTHER PUBLICATIONS

U.S. Appl. No. 14/750,844.
(Continued)

*Primary Examiner* — Daniel Lai
(74) *Attorney, Agent, or Firm* — Kramer Amado, P.C.

(57) ABSTRACT

Various embodiments relate to a system and method for performing programmable native analytics on a 5G mobile network, the system comprising a plurality of programmable native analytics agents configured to produce data digests by reducing, aggregating and binning source data, and a central analytics engine configured to collect the data digests from each of the plurality of programmable native analytics agents wherein the central analytics engine includes a plurality of enginelets which are configured to perform analytics on the data digests received by the central analytics engine.

18 Claims, 9 Drawing Sheets

(56) References Cited

U.S. PATENT DOCUMENTS

| | | | |
|---|---|---|---|
| 2005/0278270 A1* | 12/2005 | Carr | G06Q 10/10 |
| | | | 706/25 |
| 2006/0155818 A1* | 7/2006 | Odenwald | H04L 41/082 |
| | | | 709/208 |
| 2007/0027969 A1* | 2/2007 | Ishida | H04L 67/12 |
| | | | 709/222 |
| 2015/0110008 A1* | 4/2015 | Puthenpura | H04W 8/26 |
| | | | 370/329 |
| 2015/0326535 A1* | 11/2015 | Rao | H04L 63/029 |
| | | | 726/15 |
| 2016/0094420 A1* | 3/2016 | Clemm | H04L 43/04 |
| | | | 709/224 |
| 2016/0135076 A1 | 5/2016 | Grinshpun | |
| 2016/0135166 A1 | 5/2016 | Cilli | |
| 2016/0226703 A1 | 8/2016 | Grinshpun et al. | |
| 2016/0353427 A1 | 12/2016 | Grinshpun | |
| 2016/0359886 A1* | 12/2016 | Yadav | H04L 63/1425 |
| 2017/0346705 A1 | 11/2017 | Szilagyi et al. | |

OTHER PUBLICATIONS

"FG IMT-2020: Report on Standards Gap Analysis, 3GPP Draft: SG13-LS139ATT1 PLEN-208," 3rd Generation Partnership Project (3GPP), Mobile Competence Centre; 650, Route Des Lucioles; F-06921 Sophia-Antipolis Cedex France.

Notification of Transmittal of the International Search Report and the Written Opinion of the International Searching Authority, or the Declaration and International Search Report dated Dec. 11, 2017 for PCT/US2017/050015.

* cited by examiner

SYSTEM AND METHOD FOR PROGRAMMABLE NATIVE ANALYTICS IN 5G MOBILE NETWORKS

TECHNICAL FIELD

This disclosure relates generally to providing a general purpose scalable platform for 5G mobile network analytics, and more specifically, but not exclusively, to provide real-time visibility into various aspects of the 5G mobile network and the services that are executed on 5G mobile networks.

BACKGROUND

Big data analytics are critical in 5G mobile networks to make 5G mobile networks autonomic (e.g. self-scaling, self-configuring, self-healing and self-optimizing). These big data analytics make meeting the end-to-end performance and quality of experience ("QoE") of 5G mobile network applications and services effective by exporting real-time and predictive insights about the 5G mobile networks to applications and self-adapting networks to meet the needs of the specific applications.

In order to meet the needs of the 5G mobile networks, there is a need for a generic framework for big data analytics. A further requirement is that the framework has to be generic enough to allow for creating a multi-vendor market for analytics module plug-ins.

Without such a generic framework for 5G mobile networks, the issues which would persist include how to provide native analytics capabilities in 5G mobile networks instead of the current solution which is an after-thought of add-on analytics (such as in existing 2G, 3G and 4G mobile networks). Other issues that would persist include how to handle large volumes of data generated in 5G mobile networks and how to handle high velocity of data arrival in 5G mobile networks Furthermore, other issues that would persist include how to manage the wide variety and heterogeneity of data generated in the 5G mobile networks, how to collect and process data from diverse and geographically distributed data sources in the 5G mobile networks, how to meet ultra-low latency reaction times for many 5G mobile network mission critical applications such as connected autonomous vehicles, or remote robotic control, and how to enable extension of the system to support future data sources and analytics techniques.

Existing mobile networks (e.g. 2G, 3G and 4G mobile networks) were not designed with analytics as a necessary and key requirement in the architecture. In order to add an analytics framework to the existing mobile networks would require extensive network re-work and customization which would result in cost-prohibitive and intrusive changes in the deployed networks. As a result, the existing analytics solutions are at best ad-hoc add-ons, which are susceptible to deficiencies in the networks.

At present, there is no generic network insights service that exposes predictive network information and can serve as a foundation for the 5G mobile networks and application needs. The existing solutions exposing network state information are very narrow and are tied to a customized data source mining.

The best existing solution for 4G LTE mobile networks include analytics add-on devices that monitor and mirror the traffic using network probes (e.g. between a Mobile Management Entity ("MME")) and a Serving Gateway ("SGW") and between SGW and Packet Data Network Gateway ("PGW")) and transferring the mirrored data to the central analytics function (typically located in the data center) for processing.

There are several examples of data analytics in existing mobile networks. For example, FIG. 1 is related art which is directed towards an analytics add-on device for a mobile network 100. The mobile network 100 includes a radio network 107 and a core network 108. The radio network 107 includes mobile devices 106 and an Evolved Node B ("eNodeB") 109. The core network 108 includes a SGW 102 and a PGW 103. The core network 108 further includes an analytics add-on 101 and a MME 110. The analytics add-on device 101 mirrors and monitors the traffic between the MME 110 and the SGW 102, between the SGW 102 and the PGW 103, and between the PGW 103 and the PCRF 111. The solutions implemented in the mobile network 100 are inefficient and do not meet the listed above needs because the add-on analytics device 101 has significant issues for the following reasons: (a) the add-on analytic device 101 is not able to identify the class of application (email, web browsing, video streams) that the end-to-end encrypted stream represents (recall that end-to-end encryption renders deep packet inspection currently used for application class identification ineffective); (b) significant portions of the data used internally by VNFs is not designed to be exposed to other entities or not designed to be transmitted over the wires from the VNF; (c) the add-on device 101 is unable to provide self-healing in real-time and nor is it able to produce and deliver network insights in real-time.

End-to-end encryption is expected to be prevalent in the 5G mobile networks. Currently, data analysis is being conducted post-hoc (i.e. not in real time) and large data sets need to be transferred over the network to the data center for offline analysis. Furthermore, layer 1 and layer 2 wireless bearer resource allocations and channel conditions information are not available to the analytics add-on device 101. While large amounts of data are available at scheduler, Radio Link Control ("RLC"), Packet Data Convergence Protocol ("PDCP") and antenna levels, there is no mechanism available to expose this large amount of data to analytics, in real time.

The existing solutions are strongly tied to proprietary methods of exposing and processing vendor-specific types and formats of data and this is not easily extensible to support future data sources and analytics techniques.

Therefore, there is a need for a generic framework for analytics in 5G mobile networks to allow for creating a multi-vendor market for analytics module plug-ins.

SUMMARY OF EXEMPLARY EMBODIMENTS

A brief summary of various embodiments is presented below. Embodiments address the need to create a generic framework for analytics in 5G mobile networks to allow for creating a multi-vendor market for analytics module plug-ins.

In order to overcome these and other shortcomings of the prior art and in light of the present need to create a generic framework for analytics in 5G mobile networks to allow for creating a multi-vendor market for analytics module plug-ins, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a system for performing programmable native analytics on a 5G mobile network, the system comprising a plurality of programmable native analytics agents configured to produce data digests by reducing, aggregating and binning source data, and a central analytics engine configured to collect the data digests from each of the plurality of programmable native analytics agents, wherein the central analytics engine includes a plurality of enginelets which are configured to perform analytics on the data digests received by the central analytics engine.

In an embodiment of the present disclosure, the system further comprises a southbound analytics interface configured to enable communication between the central analytics engine and each of the plurality of programmable native analytics agents.

In an embodiment of the present disclosure, the system further comprises a northbound analytics interface configured to enable communications between the central analytics engine and subscribers.

In an embodiment of the present disclosure, the plurality of programmable native analytics agents are native to virtual network functions which compose the 5G mobile network.

In an embodiment of the present disclosure, the programmable native analytics agents are configured to expose the source data for analytics and perform analytics on the source data.

In an embodiment of the present disclosure, the programmable native analytics agents are programmable and extensible.

In an embodiment of the present disclosure, the output of at least one of the plurality of enginelets is input into at least one of the plurality of enginelets.

In an embodiment of the present disclosure, the central analytics engine generates network insights based on the analytics performed on the plurality of enginelets.

In an embodiment of the present disclosure, the plurality of programmable native analytics agents are configured to be programmed and controlled by the central analytics engine via the southbound analytics interface.

In an embodiment of the present disclosure, the central analytics engine is configured to transmit the network insights to subscribers over the northbound analytics interface.

In an embodiment of the present disclosure, wherein the central analytics engine receives registration information over the northbound analytics interface for network insights.

Various embodiments described herein relate to a method for performing programmable native analytics on a 5G mobile network, the method comprising producing, by a plurality of programmable native analytics agents, data digests by reducing, aggregating and binning source data, and collecting, by a central analytics engine, the data digests from each of the plurality of programmable native analytics agents, wherein the central analytics engine includes a plurality of enginelets which are configured to perform analytics on the data digests received by the central analytics engine.

In an embodiment of the present disclosure, the method comprising enabling communication, by a southbound analytics interface, between the central analytics engine and each of the plurality of programmable native analytics agents.

In an embodiment of the present disclosure, the method comprising enabling communications, by a northbound analytics interface, between the central analytics engine and subscribers.

In an embodiment of the present disclosure, the plurality of programmable native analytics agents are native to virtual network functions which compose the 5G mobile network.

In an embodiment of the present disclosure, the programmable native analytics agents are configured to perform analytics on the source data.

In an embodiment of the present disclosure, the programmable native analytics agents are programmable and extensible.

In an embodiment of the present disclosure, the output of at least one of the plurality of enginelets is input into at least one of the plurality of enginelets.

In an embodiment of the present disclosure, the central analytics engine generates network insights based on the analytics performed on the plurality of enginelets.

In an embodiment of the present disclosure, the plurality of programmable native analytics agents are configured to be programmed and controlled by the central analytics engine by the southbound analytics interface.

In an embodiment of the present disclosure, wherein the central analytics engine is configured to transmit the network insights to subscribers over the northbound analytics interface.

In an embodiment of the present disclosure, wherein the central analytics engine receives registration information over the northbound analytics interface for network insights.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features of the present invention are more fully disclosed in the following specification, reference being had to the accompanying drawings, in which:

FIG. 1 is a block diagram of an existing mobile network (e.g. a 4G mobile network) with an analytics add-on.

DETAILED DESCRIPTION OF THE INVENTION

Figure 1:
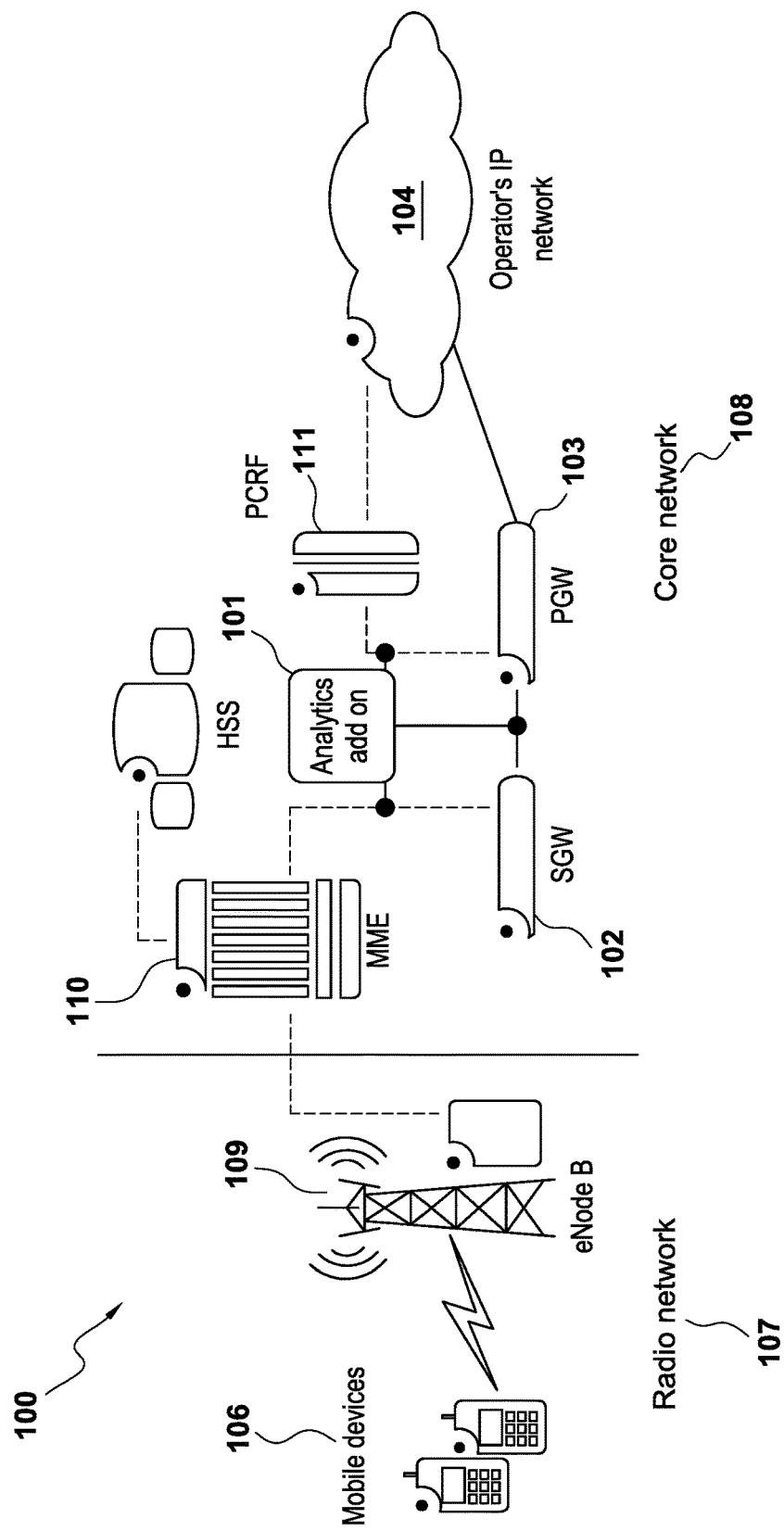

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

Figure 2:
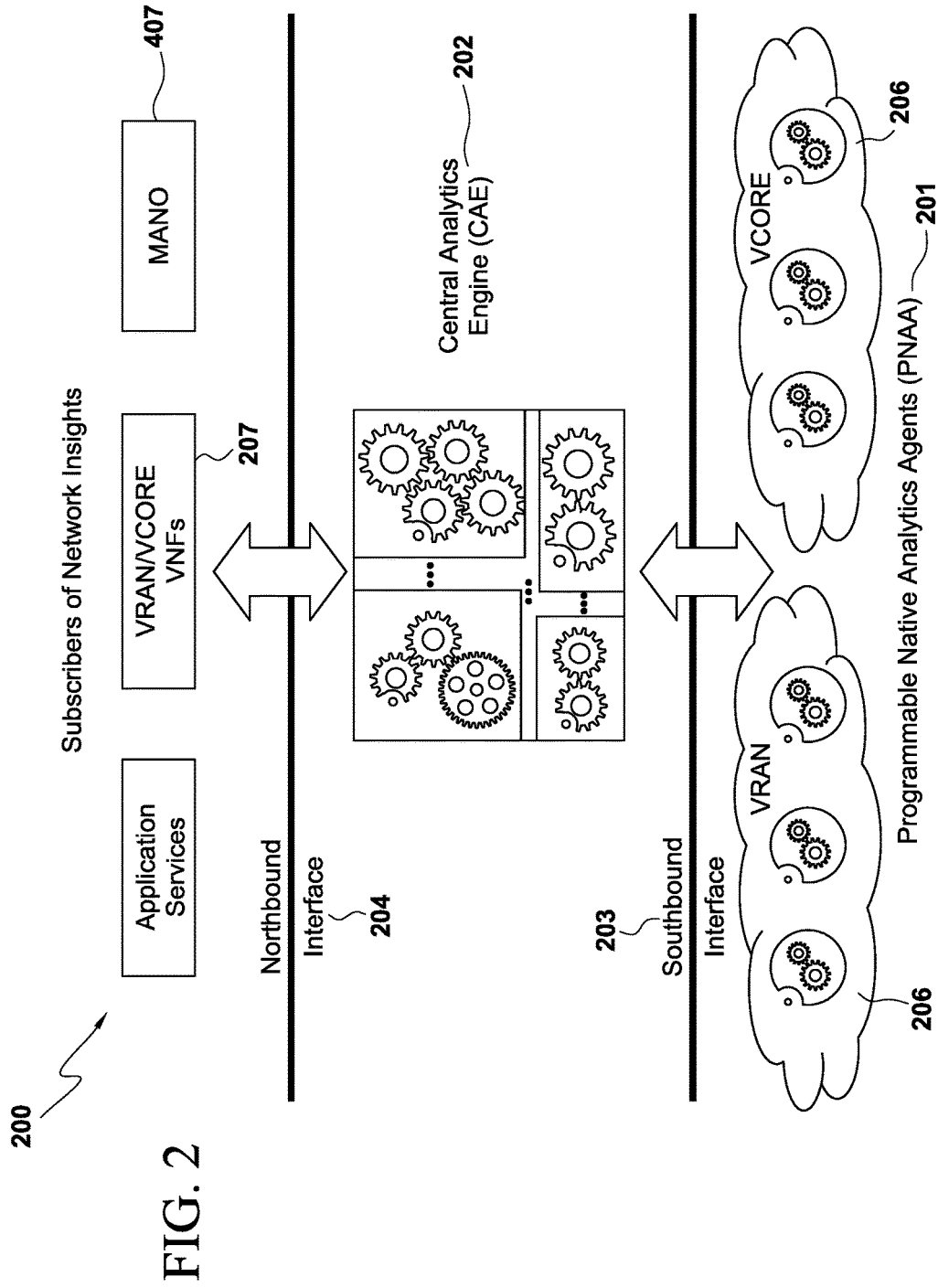
FIG. 2 is a block diagram of a programmable native analytics framework.

FIG. 2 is a block diagram for a framework of a Programmable Native Analytics ("PNA") framework 200 which is configured to enable plug-and-play operations of analytic methods and data sources. The PNA framework 200 is further configured to allow dynamic programming and control of data sources and analytics modules. The PNA framework 200 is further configured to leverage the architecture of 5G mobile networks based on virtualized Network Functions ("vNFs") and further configured to leverage distributed cloud infrastructure and various other cloud computing technologies.

The PNA framework 200 includes four components, including two entity components and two interface components.

The two entity components are Programmable Native Analytics Agents ("PNAAs") 201 and a Central Analytics Engine ("CAE") 202. Each of these individual components will be discussed in detail below.

The two interface components are the Southbound Analytics Interface ("SAT") 203 and the Northbound Analytics Interface ("NAT") 204. Each of these individual components will be discussed in detail below.

VCORE/VRAN are examples of vNFs and PNAAs 201 are entities which are native to and run on the vNFs. vNFs comprise the 5G mobile network. For example, PNAAs 201 can run on VCORE 206 or VRAN 205.

Because the PNAAs 201 are native to vNFs they are configured to have direct access to all the data generated and managed by the respective vNFs. The PNAAs 201 can reduce, aggregate and bin the source data using various data processing capabilities to produce data digests. These data digests can be smaller in size by many orders of magnitude compared to the raw data generated at the source.

The PNAAs 201 host native analytics techniques and algorithms that can perform local analytics at the data source, within the vNFs. The PNAAs 201 are configured to be programmable and extensible.

The CAE 202 is a logically centralized entity that has network-wide data visibility and a collection of distributed sub-components that can run on distributed public or private cloud infrastructures. The CAE 202 is positioned between the NAI 204 and the SAI 203.

The CAE 202 collects data digests and local insights from all the distributed PNAAs 201. The two operable layers in the CAE 202 are the Intelligence and Insights Layer 403 and the Analytics and Processing Layer 405, as discussed in FIG. 4 below.

When a subscriber subscribes on the NAI 204 for a service insight, a number of steps are executed which occur in a systemic order between a subscriber subscribing for an insight service and the system delivering that insight to the subscriber, as discussed in FIG. 5 below.

Figure 3:
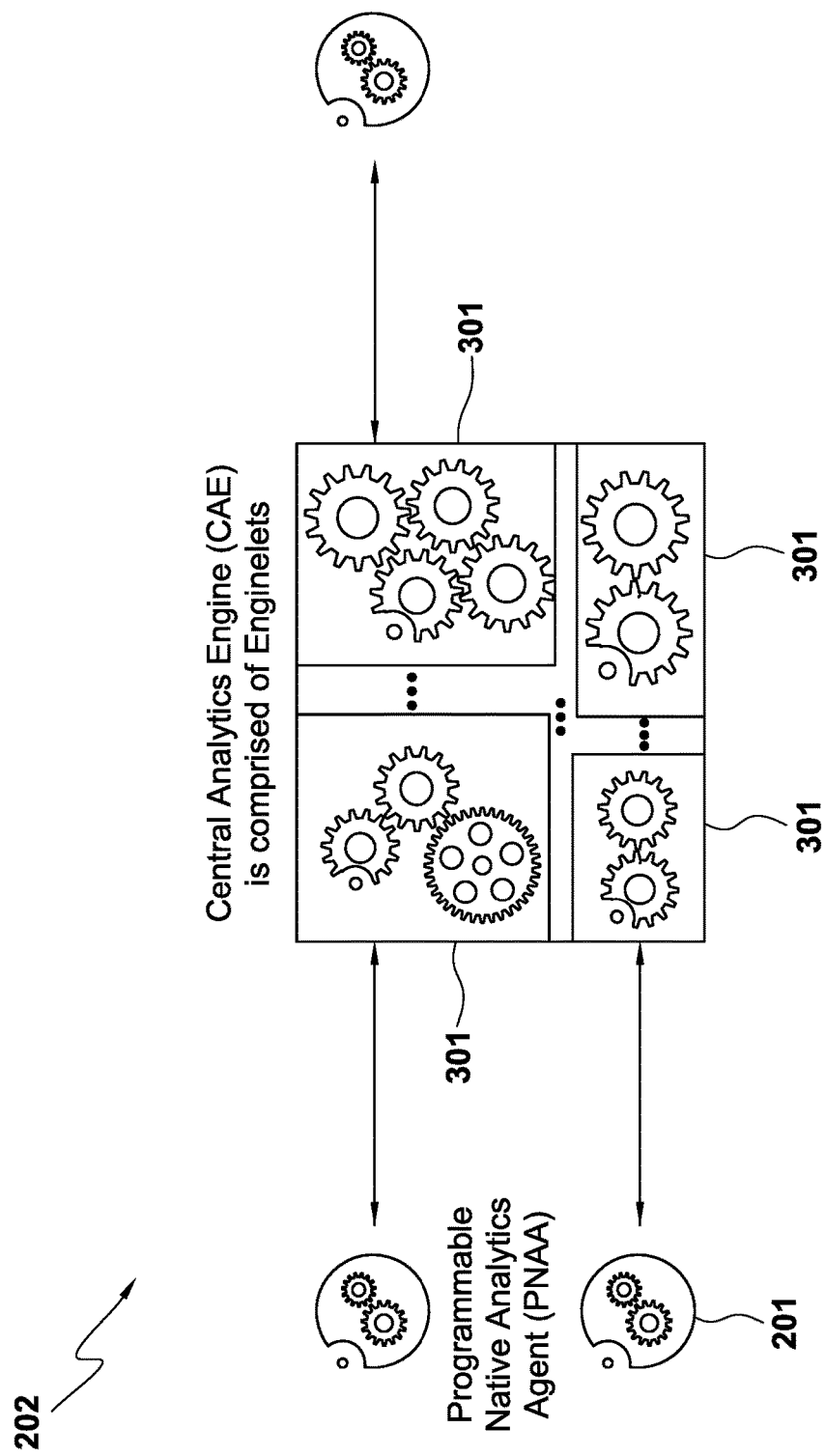
FIG. 3 is a block diagram of enginelets.

FIG. 3 is a block diagram of a CAE 202 including a plurality of enginelets 301. The enginelets consist of a Persistent Storage Layer 404, an Analytics and Processing Layer 405 and a Messaging and Communication Layer 406, which perform specific analytics techniques or algorithms on the collected data.

The enginelets 301 can be pipelined so that the output of some enginelets 301 are fed into other enginelets 301. In one embodiment, the pipelining can be performed by the messaging layer 406 (output of one enginelet 301 is sent as an input to another enginelet 301 as one or more messages).

In another embodiment, the pipelining may be performed using the Persistent Storage Layer 404 (output of one enginelet 301 is written to a Persistent Storage Layer 404 and another enginelet 301 reads its input from the Persistent Storage Layer 404).

In yet another embodiment, a combination of the two embodiments above may be used (one enginelet 301 writes its output to a Persistent Storage Layer 404 and also sends a message to another enginelet 301 indicating that the data is written).

The CAE 202 generates network insights that are offered as an "as a service" model to various subscribers. Enginelets as discussed in more details below.

Figure 4:
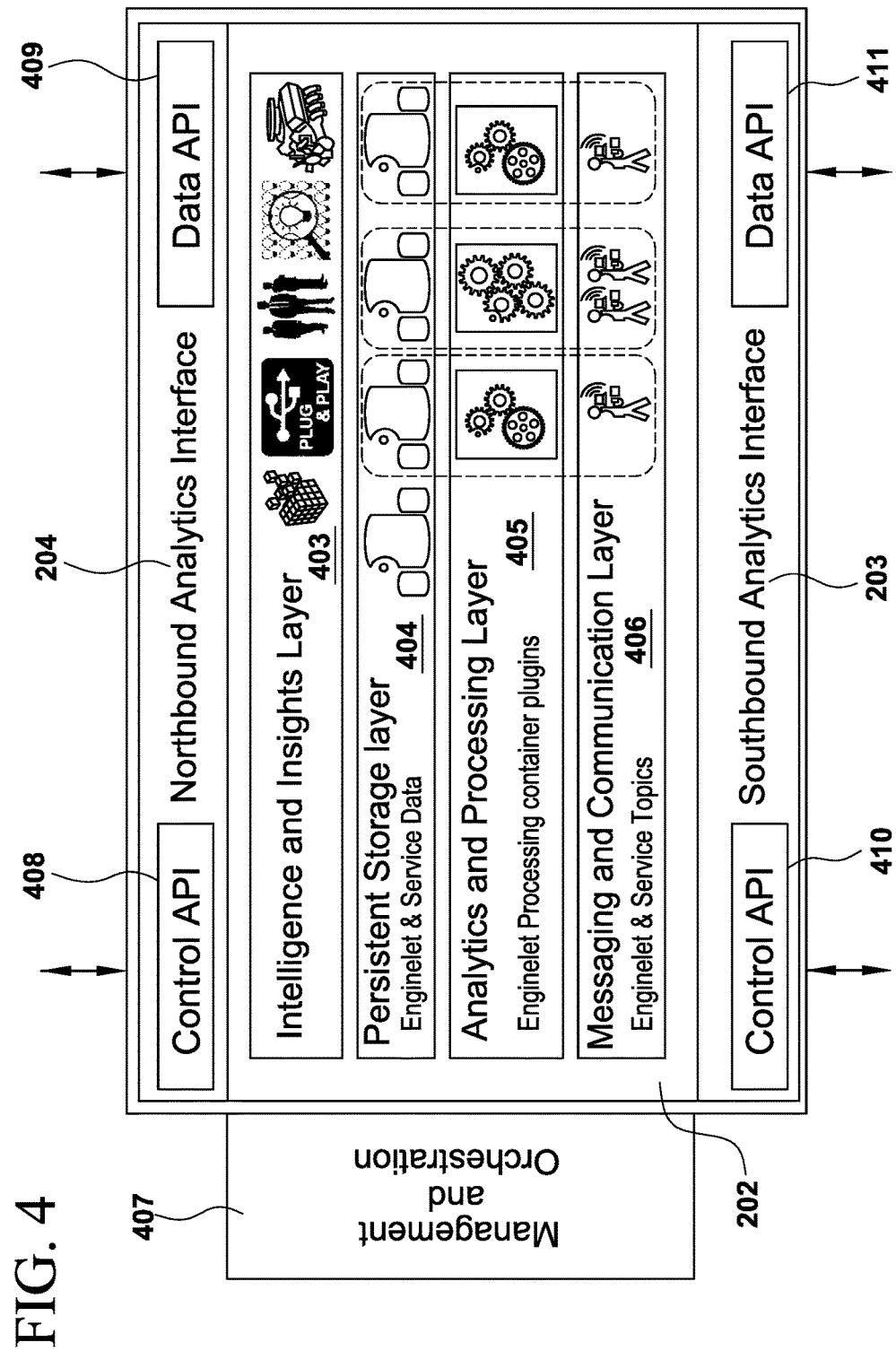
FIG. 4 is a high level view of a central analytics engine.

FIG. 4 is a block diagram of the CAE 202 connected to a NAI 204 and a SAI 203. The SAI 203 is for communication between CAE 202 and PNAAs 201. The NAI 204 is for communication between CAE 202 and subscribers of analytics service.

The PNAAs 201 perform data collection at source, data aggregation, binning, pre-processing of the data (relatively low CPU intensity and low complexity).

The PNAAs 201 create and send data digests to the CAE 202 using the SAI 203.

The PNAAs 201 perform local analytics techniques and algorithms that run natively on the PNAAs 201.

The PNAAs 201 perform local insight generation and distribution for localized use or for aggregation into broader contexts.

In another embodiment, the analytics algorithm is subdivided wherein part of the analytics is performed at the PNAA 201 and its output is sent by the SAI 203 to an enginelet 301 within the CAE 202 that performs another part of the algorithm.

The PNAAs 201 provide analytics requiring low latency reaction times.

The PNAAs 201 are programmed and are controlled by the CAE 202 using the SAI 203.

PNAAs 201 have access to the source data needed for native analytic processing, data collection, data pre-processing and data digest reporting of various capabilities to the CAE 202.

The vNF data may be partitioned such that only the data needed for analytics is accessible to the PNAAs 201 (i.e., all other data is restricted).

With tightly coupled integration, the PNAAs 201 may access the data directly. For loosely coupled integration, the data would need to be accessed indirectly by a vNF 207.

Various other embodiments, including other configurations may be possible depending on the latency requirements. For example, a PNAA 201 could be instantiated within a container within the same virtual machine as the vNF 207, or separate from the vNF 207 within its own virtual machine. In both of these cases, the vNF 207 would need to specify and provide the necessary application programming interfaces ("APIs") in order for the PNAAs 201 to access the necessary and required data.

PNAAs 201 communicate with the CAE 202 over the SAI 203. A PNAA 201 may decide to implement the SAI 203 directly, in which case the PNAA 201 is responsible for communication with the CAE 202.

In another embodiment, a framework library or API may be provided which implements the SAI 203. The alternative embodiment shields the PNAA 201 from the details of the SAI 203 through APIs and callbacks.

The purpose of the CAE 202 is to provide network insights "as a service" to subscribers over NAI 204 by programming PNAAs 201 through SAI 203 and managing plug-and-play analytics modules (i.e. enginelets 301 and PNAAs 201).

As discussed above, the CAE 202 includes multiple entities which are referred to as enginelets 301. The enginelets 301 are analytics modules which implement specific analytics or algorithms.

The enginelets 301 implement specific analytics techniques and/or algorithms.

The enginelets 301 receive and process data from various PNAAs 201. Furthermore, an enginelet 301 may receive and process the data from the PNAAs with a network-wide view (as opposed to a single vNF) both geographically disperse and cross functional layers (e.g. from PNAAs associated with OSI layers 1-7 and different vNFs associated with Control and Data plane processing of the Access network).

The enginelets 301 generate specific insights.

The enginelets 301 support enginelet 301 chaining.

The enginelets 301 pass the results of the processing from one enginelet 301 to another (e.g., the following multistep bearer throughput prediction based upon the output of the UE location prediction which determines the serving cells along the predicted path, pipelines the prediction of cell congestion for the serving cells together with the prediction of UE channel conditions to produce UE throughput prediction insights).

The Intelligence and Insights Layer 403 is the core of the CAE 202. The Intelligence and Insights Layer 403 coordinates the various components to result in service insights being delivered to the subscriber.

The Intelligence and Insights Layer 403 includes a registry to store the registered PNAAs 201 and enginelets 301, a component to control and/or program the PNAAs 201, a component to deliver service insights to subscribers and a component to manage the enginelet 301 lifecycle.

The Intelligence and Insights Layer 403 includes the plug-and-play feature of the PNAAs 201, enginelets 301, services, a registry (for registrations), PNAA 201 control (for programming) and insights.

The Intelligence and Insights Layer 403 includes all of the logic for combining the elements and interacting with Management and Orchestration 407.

The CAE 202 includes a Persistent Storage Layer 404 which is configured to hold the insights generated by the enginelets 301 that are used for distribution to subscribers of the services.

The CAE 202 includes an Analytics and Processing Layer 405 which is configured to contain the models and algorithms that operate on the data made available by the PNAAs 201 and other enginelets 301.

The CAE 202 includes a Messaging and Communications Layer 406 which is configured to provide for the routing of data from PNAAs 201 to enginelets 301 and between enginelets 301 that make up the pipelining of communications within the CAE 202.

For example, the Messaging and Communications Layer 406 may be implemented using Apache Kafka, an open-source messagedeveloped by the Apache Software Foundation; Persistent Storage Layer 404 may be implemented using Apache Cassandra, an open-source distributed database management system and Analytics and Processing Layer 405 may be implemented using Apache Spark, an open source cluster computing framework.

Enginelets 301 may use one or more Kafka topics (inputs and outputs), one or more Cassandra keyspace tables and one or more Spark Streaming processing modules using Kafka consumers for input and Kafka producers for output.

Enginelets 301 chaining may be achieved by previous enginelet 301 writing their output to the input Kafka topic of the next enginelet 301. Further, Cassandra data tables may be used for passing some input and/or output information between the chained enginelets 301.

The CAE 202 further includes a Management and Orchestration 407 which is configured to control the various components within CAE 202 and assist in the lifecycle of various resources and components within the CAE 202.

Figure 5:
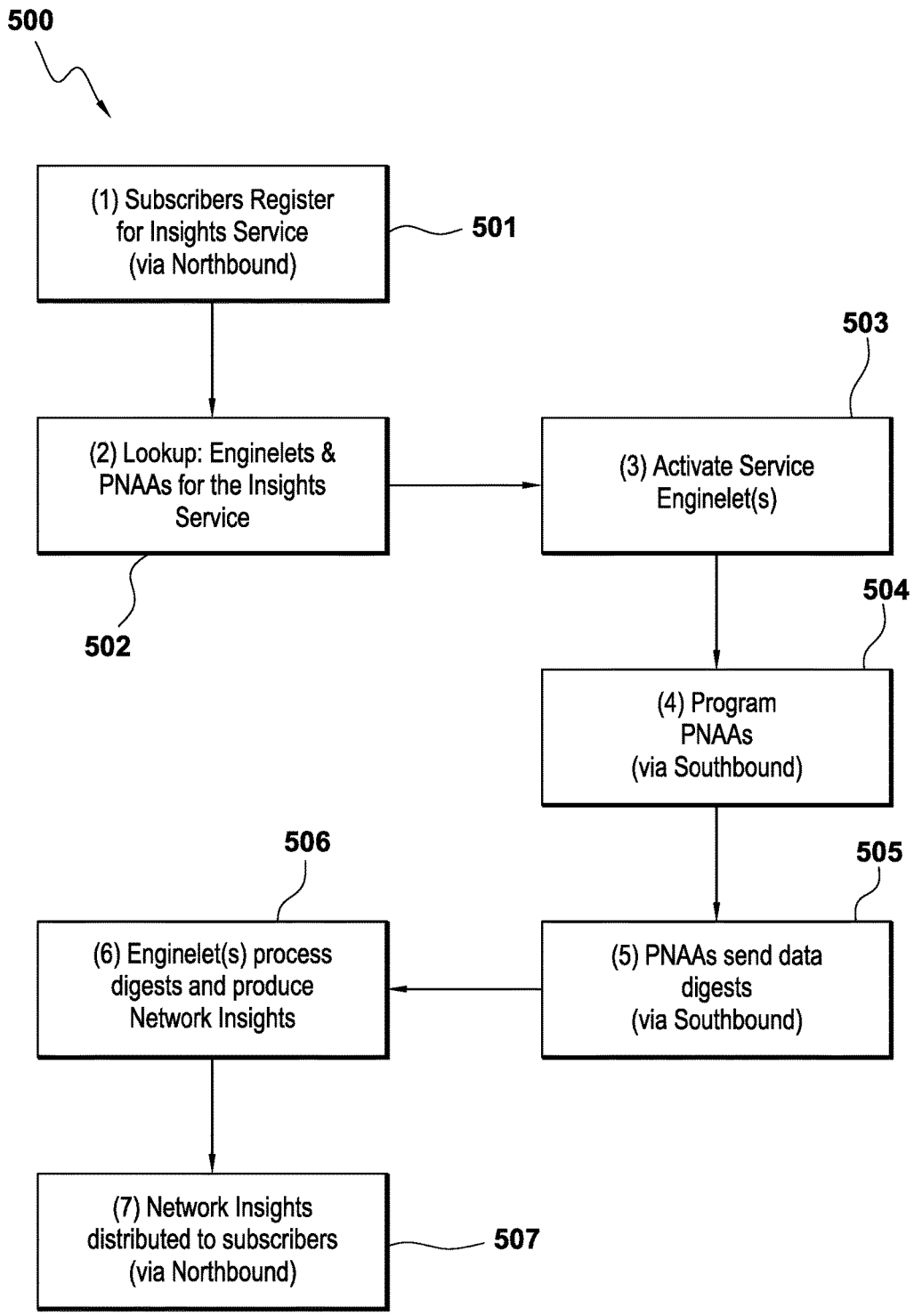
FIG. 5 is a flow chart for network insights service operation process.

FIG. 5 illustrates a flow chart for a network insight service process performed by the CAE 202. The network insight service 500 begins with step 501 where the subscriber registers for the available and/or advertised insights service through the NAI Control Plane 408. This registration in step 501 provides service specific parameters including what kind of insights are available, how frequently to send the insights, optional format for the insights, and where to send the insights.

The network insight service 500 then proceeds to step 502 where the CAE 202 determines which enginelets 301 and PNAAs 201 are needed to provide the respective insight services.

The network insight service 500 then proceeds to step 503 where the CAE 202 activates the corresponding enginelets 301 to prepare for receiving the data from the PNAAs 201 and producing the insights.

The network insight service 500 then proceeds to step 504 where the CAE 202 programs, through the SAI Control Plane 410, the PNAAs 201 that produce data digests for the insight services.

This programming is based upon the PNAA 201 capabilities determined during PNAA 201 registration and includes what kind of data to collect, what kind of aggregation and/or binning to perform and preprocessing to perform, what kind of local analytics to perform, at what frequency to send the data digest streams, where to send the data and which protocol to use for sending. The CAE 202 also instructs the PNAAs 201 to begin sending the data digest streams.

The network insight service 500 then proceeds to step 505 where the PNAAs 201 start sending the data digests streams through the SAI Data Plane 411, according to the programming (in step 504).

The network insight service 500 then proceeds to step 506 where the CAE 202 receives the data streams from the PNAAs 201 and subsequently runs the analytics algorithms and produces the insights.

The network insight service 500 then proceeds to step 507 where the network insights produced (in step 506) are distributed to the subscribers through the NAI Data Plane 409, in accordance with the registered insights service parameters.

For example, when performing these analytics, the application function (e.g. video service) registers through the NAI Control Plane 408 to receive insights for a plurality of subjects, specifically: (a) expected serving cell congestion level, and/or (b) expected UE channel conditions information, and/or (c) expected UE throughput over a wireless link.

As discussed above, the CAE 202 includes the Intelligence and Insights Layer 403 which instantiates enginelets 301 associated with, as discussed above: (a) computing congestion level, and/or (b) computing predictive channel conditions, and/or (c) computing predictive throughput for the cells and UEs associated with the service.

The number of virtual instances for each enginelet 301 may be scaled up or scaled down by the Management and Orchestration 407 based upon the number of cells and/or the number of UEs associated with the video service.

The Intelligence and Insights Layer 403 within the CAE 202, through SAI 203, programs and starts PNAAs associated with (a) (above) and (c) (above) VRAN 205 scheduler, producing per cell and congestion level related digests (e.g. in the form of Averaged Number of Physical Resource Blocks ("PRB") available every one second to "very active user") (the PNAA processing and digests, for example, as described in U.S. Pat. Pub. 2016/0135076, which is hereby incorporated by references for all purposes) and/or (b) (above) and/or (c) (above) VRAN 205 scheduler, producing per bearer channel conditions related digests (e.g., in the form of averaged PRB distribution per MCS (the PNAA processing and digests, for example, as described in U.S. patent application Ser. No. 14/724,352, which is hereby incorporated by references for all purposes) and/or (b) (above) and (c) (above) MME, producing digests related to mapping of the globally unique bearer ID to the corresponding assigned IP address and International Mobile Subscriber Identity ("IMSI") (the PNAA processing and digests, for example, as described in the U.S. Pat. Pub. 2016/0135166, which is hereby incorporated by references for all purposes) and/or (b) (above) and (c) (above) PGW, producing digests related to mapping of UE IMSI to the assigned IP address.

The programmed PNAAs 201 start aggregating the corresponding data over the averaging periods, programmed through SAI 203, and periodically (the associated frequency is also programmed through SAI 203) sending the corresponding digests to the CAE 202 through SAI Data Plane 411.

Furthermore, the CAE 202 enginelets 301 start processing the received data and generating insights for (a), and/or (b), and/or (c) (processing performed, for example, as described in U.S. Pat. Pub. 2016/0135076, which is hereby incorporated by references for all purposes) and the CAE 202 starts sending the insights to the registered application functions through the NAI 204. The enginelet 103 (a) (processing performed, for example, as described in U.S. Pat. App. 2016/0135076, which is hereby incorporated by references for all purposes). The enginelet 103 (b) (processing performed, for example, as described in U.S. patent application Ser. No. 14/724,352 and U.S. Pat. Pub. 2016/0135166, which are hereby incorporated by references for all purposes). The enginelet 103 (c) (processing performed, for example, in the U.S. patent application Ser. No. 14/607,990, which is hereby incorporated by references for all purposes). The enginelet 103 (c) (processing performed using information produced by the enginelets 103 (a) and (b)).

Finally, the application function receives the insights and adjusts application behavior to the current and expected network conditions.

For another example, performing analytics based on network insights to VRAN 205 for an application aware scheduling service. When performing these analytics, the VRAN 205 scheduling subscribes to receive analytics insights regarding what application type is carried by the bearers (e.g., which bearers are carrying video traffic) and what is the optimal averaged target rate for these bearers.

In the CAE 202, the Intelligence and Insights Layer 403 instantiates the analytics enginelets 301 associated with (a), (b), (c) (above) (system and method for application type identification, for example, as described in U.S. patent application Ser. No. 14/610,598, which is hereby incorporated by references for all purposes) as well as enginelets 301 for (d) which is for application type identification and enginelets 301 for (e) which is for computing jointly optimized target rates. The number of virtual instances for each enginelet 301 may be scaled up or down by the Management and Orchestration 407 in the CAE 202 based upon the number of cells and/or the number of UEs associated with the video service.

The Intelligence and Insights Layer 403 through the SAI 203 programs and starts PNAAs 201 associated with (a), (b), (c) (above). The PNAA processing and digests for (d) (as described, for example, in the U.S. patent application Ser. No. 14/610,598). The PNAA processing and digests for (e) (as described, for example, in U.S. patent application Ser. No. 14/750,844, which is hereby incorporated by references for all purposes)

The programmed PNAAs 201 start aggregating the corresponding data over the averaging periods, programmed through SAI 203, and periodically (the associated frequency is also programmed through SAI 203) sending the corresponding digests to the CAE 202 through SAI Data Plane 411.

The CAE 202 enginelets 301 start to process the received data and generate insights for (d) and (e) (above) and the CAE 202 starts sending the insights to the registered VRAN 205 scheduling function through the NAI 204. Finally, the VRAN 205 scheduling applies application specific treatment to the reported bearers (e.g., if under congestion, sets higher target rates per received insights for the bearers carrying adaptive streaming video and lower target rates for the bearers carrying a larger amount of FTP traffic).

For another example, performing analytics based on network insights to Management and Orchestration 407. When performing these analytics, the Management and Orchestration 407 subscribes through the NAI 204 to receive analytic insights regarding (f) which is for predicted equipment failures and/or (g) which is predicted network traffic increase or decrease in specific areas.

The Intelligence and Insights Layer 403 in the CAE 202 instantiates analytics enginelets 301 associated with (f) and (g) (above).

The Intelligence and Insights Layer 403 through the SAI 203 programs and starts PNAAs 201 associated with (f) and (g) (above).

In another embodiment, PNAAs 201 for (f) (above) are located within each VRAN 205 and VCORE 206 functions (e.g., schedulers, RLC, PDCP, cell controllers, MME, gateways, PCRF, HSS). The PNAAs 201 parse the corresponding run time log files, in real time, for errors, extracting only a subset from the log files based upon key words or other programmed (through the SAI 203) filtering information and performing initial statistics collection for the extracted logs and producing detection digests.

In another embodiment, PNAAs 201 for (g) (above) are associated within certain data plane virtual functions (e.g. scheduler, RLC, PDCP, gateways). The PNAAs 201 collect and aggregate raw data which allows for predicting traffic increases or decreases in the corresponding geographic service areas.

The programmed PNAAs 201 start aggregating the corresponding data over the averaging periods, programmed through SAI 203, and periodically (the associated frequency is also programmed through SAI 203) sending the corresponding digests to the CAE 202 through the SAI Data Plane 411.

The CAE 202 enginelets 301 start processing the received data and generating insights for (f) and (g) (above).

In another embodiment, the enginelet 301 for (f) (above), processing may utilize the non-parametric statistical Chi-Square test to distinguish between normal and outage minutes.

In another embodiment, the enginelet 301 for (f) (above), processing may utilize a parametric statistical test like Gaussian Mixture Models ("GMM") to distinguish between normal and outage minutes In another embodiment, the enginelet 301 for (g), processing may utilize joint the Autoregressive Integrated Moving Average ("ARIMA") models.

The CAE 202 begins sending the insights to the registered network Management and Orchestration 407 over the NAI 204.

Upon receiving insights for (f) (above) on expected/detected network function outage, the Network Intelligence and Insights Layer 403 instructs Management and Orchestration 407 to initiate corresponding recovery procedures. Upon receiving insights (g) (above) on the expected network traffic increase (or decrease), the Network Intelligence and Insights Layer 304 instructs Management and Orchestration 407 to proactively scales up (or down) the capacity of the respective virtual network functions (e.g., by initializing additional hardware instances).

The SAI 203 functions to ensure that the PNAAs 201 are capable of discovery by the CAE 202, such that the PNAAs 201 are programmed by the CAE 202 and that CAE 202 enginelets 301 receive data digest streams from the PNAAs 201.

The NAI 204 includes two planes, specifically a NAI Control Plane 408 and a NAI Data Plane 409.

The NAI Control Plane 408 is used primarily for authentication, authorization, service advertisement, and service subscription. The subscribers of network insights (applications, VRAN 205 and/or VCORE 206 functions, or Management and Orchestration 407 functions) are expected to use the NAI Control Plane 408 to subscribe to the insights service offered by the CAE 202, thereby causing the CAE 202 to execute the specific service and send insights to these subscribers.

NAI Data Plane 409 is used for sending network insights to the subscribers.

Figure 7:
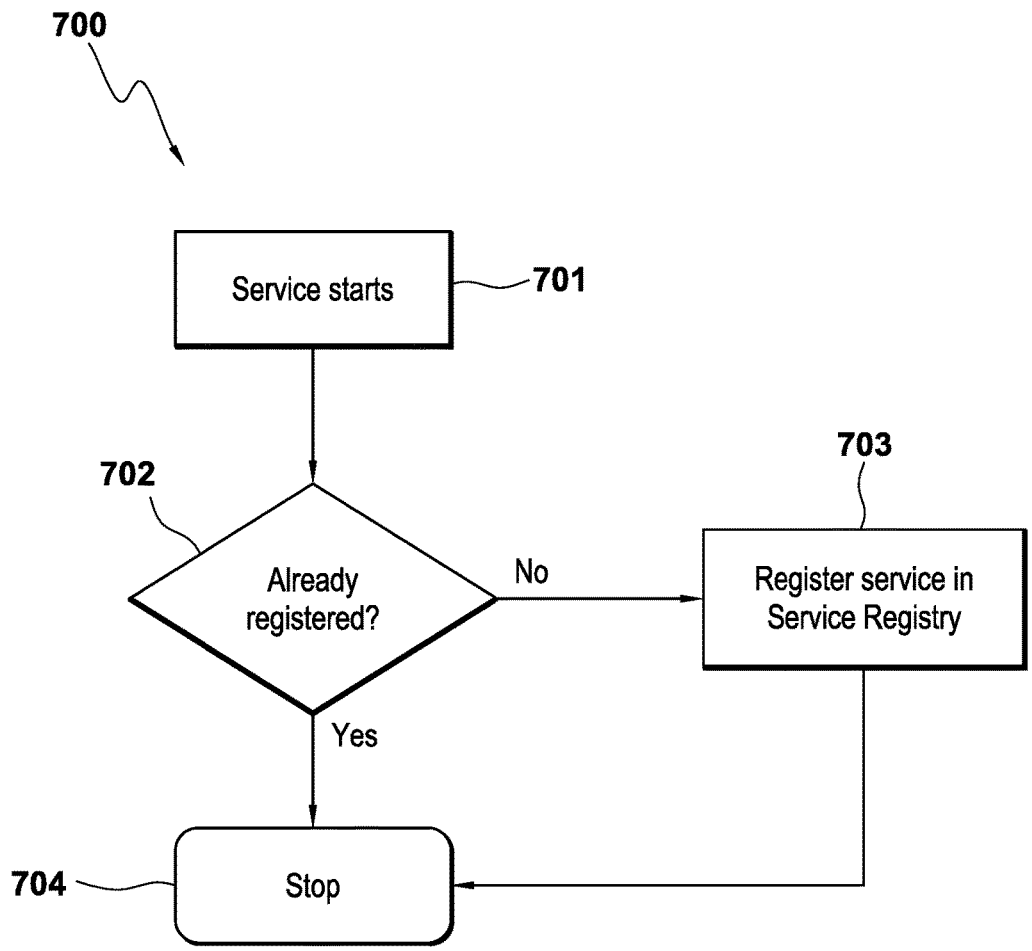
FIG. 7 is a flow chart for network insights advertisement process.

FIG. 7 illustrates the procedure 700 for network insight service advertisements undertaken with the CAE 202.

The procedure 700 begins with step 701 which begins the process.

The procedure 700 proceeds to step 702 which determines whether registration has occurred. If yes, step 704 stops the process. If no, step 703 registers service in the service registry then proceeds to end the procedure 700 at step 704.

Figure 6:
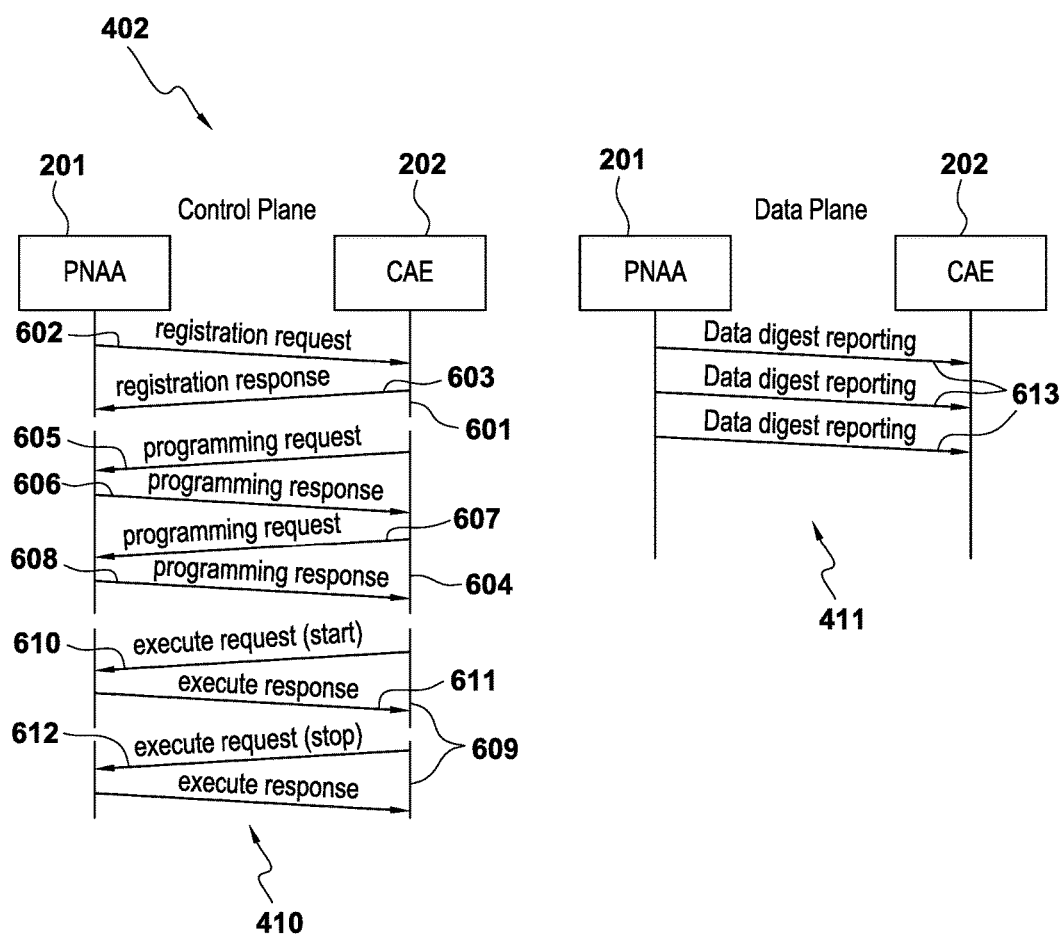
FIG. 6 is a flow chart for southbound analytics interface.

FIG. 6 illustrates a SAI 203 message flow diagram. The SAI 203 includes two planes, specifically, a SAI Control Plane 601 and a SAI Data Plane 602.

The SAI Control Plane 410 is between the PNAAs 201 and the CAE 202 and is used for the PNAAs 201 discovery, announcing presence, sharing capabilities and programming, and/or controlling the PNAAs 201.

The programming and/or control of the SAI 203 is based upon the announced (during PNAA 201 registration) capabilities and includes what kind of data to collect, where to send the digested data (e.g., IP address, port number, etc.), how often and in which format the data digest is to be sent to the CAE 202, aggregation and/or binning configuration parameters (e.g., time duration of the bin), what kind of data preprocessing to perform (e.g., statistical average, standard deviation, other), what kind of local analytics techniques and/or algorithms to run, and when to start/stop data collection.

The SAI Data Plane 411 is configured to send the preprocessed data digests streams from PNAA 201 to CAE 202. PNAAs 201 expose programmable (e.g., digested) native source data streams and/or programmable native analytics on the data source. Both of these are managed as features, organized as a set of individual capabilities.

These capabilities are announced during the PNAAs 201 registration with the CAE 202 and have a number of controllable parameters that allow for customization of native analytic processing, data collection, data preprocessing, and data reporting. These programmable aspects offer a flexible native analytics environment, efficient use of the data, and a reduction in source data sent to the CAE 202 for processing.

In another embodiment, security and encryption mechanisms are used for authentication and/or authorization of the PNAAs 201 by the CAE 202 as well as protecting the confidentiality of the exchanged data.

In another embodiment, the SAI Control Plane 410 and the SAI Data Plane 411 exchange are based upon messages) with defined headers (distinct for the SAI Control Plane 410 and the SAI Data Plane 411 and Type-Length-Values ("TLVs") within message bodies.

In another embodiment, Transport Layer Security ("TLS") over Transport Control Protocol ("TCP") is used for SAI Control Plane 410 and Datagram Transport Layer Security ("DTLS") over User Datagram Protocol ("UDP") is used for SAI Data Plane 411 for messages sent over the control and data planes, respectively. Messages sent over these control and data planes include a defined header.

The control plane (for NAI 204 and SAI 203) controls registration, programming, and execution. Registration is used to announce the PNAAs 201 presence and capabilities to the CAE 202.

Programming allows for configuration and customization of individual capabilities (i.e., native analytic processing, data collection, data preprocessing and data reporting).

Registration is the initial state of the PNAA 201. In the registration state 601, the PNAA 201 announces its presence and capabilities to the CAE 202. The registration state 601 is a registration request 602 and a registration response 603 exchange initiated by the PNAA 201.

The three components that make up the request include PNAAs description, enginelet identifiers, and PNAAs capabilities.

The PNAAs description describes the PNAAs 201 and contains (at a minimum) a namespace identifier that uniquely identifies the PNAA 201.

The enginelet identifiers contain namespace identifiers (similar to that used by the PNAA description) that serve to identify the set of enginelets 301 compatible with this PNAA 201.

The PNAA description and enginelet identifiers play a significant role in the plug-and-play feature of the system.

The PNAAs capabilities are features being offered by the PNAAs 201. A successful registration exchange is then configured to transition to the program state.

In the programming state 604, the PNAAs 201 are not actively processing any capability. The CAE 202 programs various aspects of the PNAAs 201 operation through configuration and customization of individual capabilities (i.e., native analytic processing, data collection, pre-processing, and digest reporting).

The programming state 604 (discussed above) includes data reporting configuration and capability configuration attributes. The data reporting configuration identifies the components that are used for data digest reporting (e.g., selects the data plane protocol and security method, identifies the recipient of data digest reports and includes an enginelet 301 mailbox identifier that correlates data digest reporting with this instance of the PNAAs 201).

The capability configuration attributes include an optional set of controllable parameters that contain values used to customize native analytic processing, data collection, data pre-processing and data reporting. Any controllable parameter not specified is left unchanged (i.e., if A, B, C are control parameters and A is changed in one program exchange, and B is changed in a second program exchange. The second program exchange does not set A to its default value).

The programming state 604 of the PNAAs 201 may be performed over multiple a first programming requests 605 and/or a first programming response 606 exchanges. The programming state 604 of these exchanges is cumulative. A second programming request 607 that contains the same controllable parameter as a first programming request 605 will supersede the value from the first programming request 605. A successful start of the programming state 604 exchange will then transition to the execute state.

In the execute state 609, the PNAAs 201 are actively executing individual capabilities (e.g. native analytic processing, collecting the requested data, aggregating and/or binning the data, performing the requested pre-processing on the data), and transmitting the data digest to the recipient at the frequency and format specified during the programming phase.

The PNAAs 201 enter the execute state 609 only after the successful start of the execution exchange. Execution is an execute request (start) 610 and execute response 611 exchange initiated by the CAE 202. The execute state 609 provides the mechanism to start 610 and stop 612 the processing of individual capabilities within the PNAAs 201. A successful stop 612 of the execution state 609 exchange will then transition to the programming state 604.

Each data digest report may be transmitted in a single message 613 sent over the data plane using the protocol and security mechanism specified during the programming state 604. The message consists of a defined header followed by per PNAAs 201 and per capability specific payload. The defined header holds the enginelet 301 mailbox identifier received during the programming state 604 and a sequence number that is incremented for each new data digest report sent (initially set to one following the start of the execution exchange). The enginelet 301 mailbox identifier is used to correlate the data digest reports with a specific PNAA 201 instance and capability while the sequence number is used to aid in the detection of dropped and out of order messages (especially when unreliable transports are used).

It is permissible to accept and process programming requests 605, 607 and programming responses 606, 608 exchanges in the execute state to allow for dynamic reconfiguration and/or customization of individual capabilities.

The NAI 204 supports mutual authentication of the service to subscriber and of the subscriber to the service, mutual authorization of the service to the subscriber and of the subscriber to the service, advertise the service to subscribers (after all of the service ingredients are registered). The NAI Control Plane 408 supports subscribing for network insights service. The NAI Data Plane supports providing network insights to subscribers.

The Plug-n-Play Framework ("PPF") within the CAE 202 for analytics modules allows for dynamically instantiation of new enginelets 301 and the PNAAs 201 that may not have existed at the time of network deployment and to enable non-intrusive extension of capabilities of all entities including VNFs 207, PNAAs 201, and CAE 202. The PPF allows for creation of a market for vendors of analytics modules, both PNAAs 201 and enginelets 301.

Figure 8:
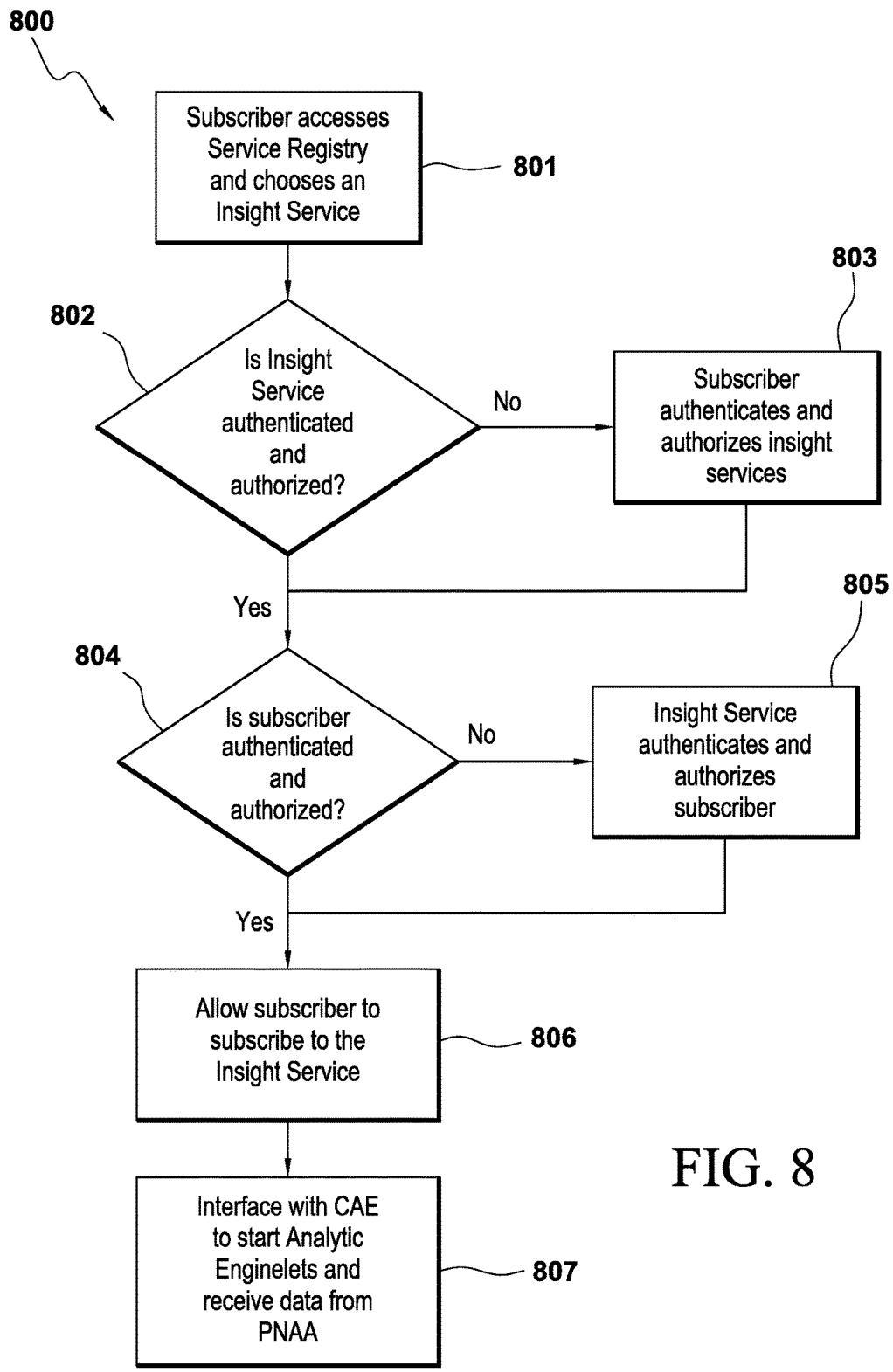
FIG. 8 is a flow chart for insights service subscription process.

FIG. 8 illustrates a flow chart for an insights service subscription process.

The insights service subscription process 800 begins with step 801 where the application browsing the available insight services in the service registry and selects one or more insight services to subscribe to.

The insights service subscription process 800 then proceeds to step 802 and/or 803 where mutual authentication is performed, if it has not been performed (i.e. the insight service authenticates itself to the subscriber. For example, through HTTPS).

The insights service subscription process 800 then proceeds to step 804 and/or 805, where the subscriber authenticates itself to the insight service (through means such as a pre-shared secret). Additionally and optionally, the subscriber may provide a key and/or a token that the insight service should be in possession of in order to send network insights to the subscriber.

The insights service subscription process 800 then proceeds to step 806, after the mutual authentication and authorization step is completed, at step 805, the subscriber subscribes to the insight service.

The insights service subscription process 800 then proceeds to step 807, where the NAI 204 next interfaces with the CAE 202 to start the remaining analytic process.

Furthermore, the NAI 204 and SAI 203 may be standardized in the relevant standards bodies (e.g. $3^{rd}$ Generation Partnership Project ("3GPP") and/or "European Telecommunications Standards Institute ("ETSI")). Standardization of the NAI 204 and SAI 203 will enable plug-and play among multiple vendors while ensuring differentiation of one vendor.

Alternatively, the NAI 204 and SAI 203 may be published (e.g. similarly to OpenFlow SDN interfaces), allowing different vendors to produce interface-compliant produce.

In another embodiment, specific protocols used for the NAI Control Plane 408 and the NAI Data Plane 409 are based on IPS with the body of the HTTPS messages defining the network insights that are being transported.

In another embodiment, of a specific protocol may include other standardized protocols (BEEP [RFC3080, RFC3081]) or bespoke protocols that can provide authentication, authorization, service advertisement, subscription, and notification of network insights. There may be considerable time between a subscription and the corresponding notification that contains the insight. The insight notification will, in such cases, be delivered on the data plane and may use protocols, other than HTTPS.

When an insight service starts in the CAE 202, it is required to advertise itself so the subscribers are able to subscribe to it; discovery protocols including, but not limited to, Session Announcement Protocol (SAP), Service Location Protocol (SLP), Bonjour, Dynamic Host Control Protocol (DHCP) and others (FIG. 8, above) may be used.

In summary, when the insight service starts, it determines whether or not it has been registered in a service registry. If it has not been registered, the service will register itself in the registry. Subscribers simply traverse the service registry looking for specific insight services of interest.

Figure 9:
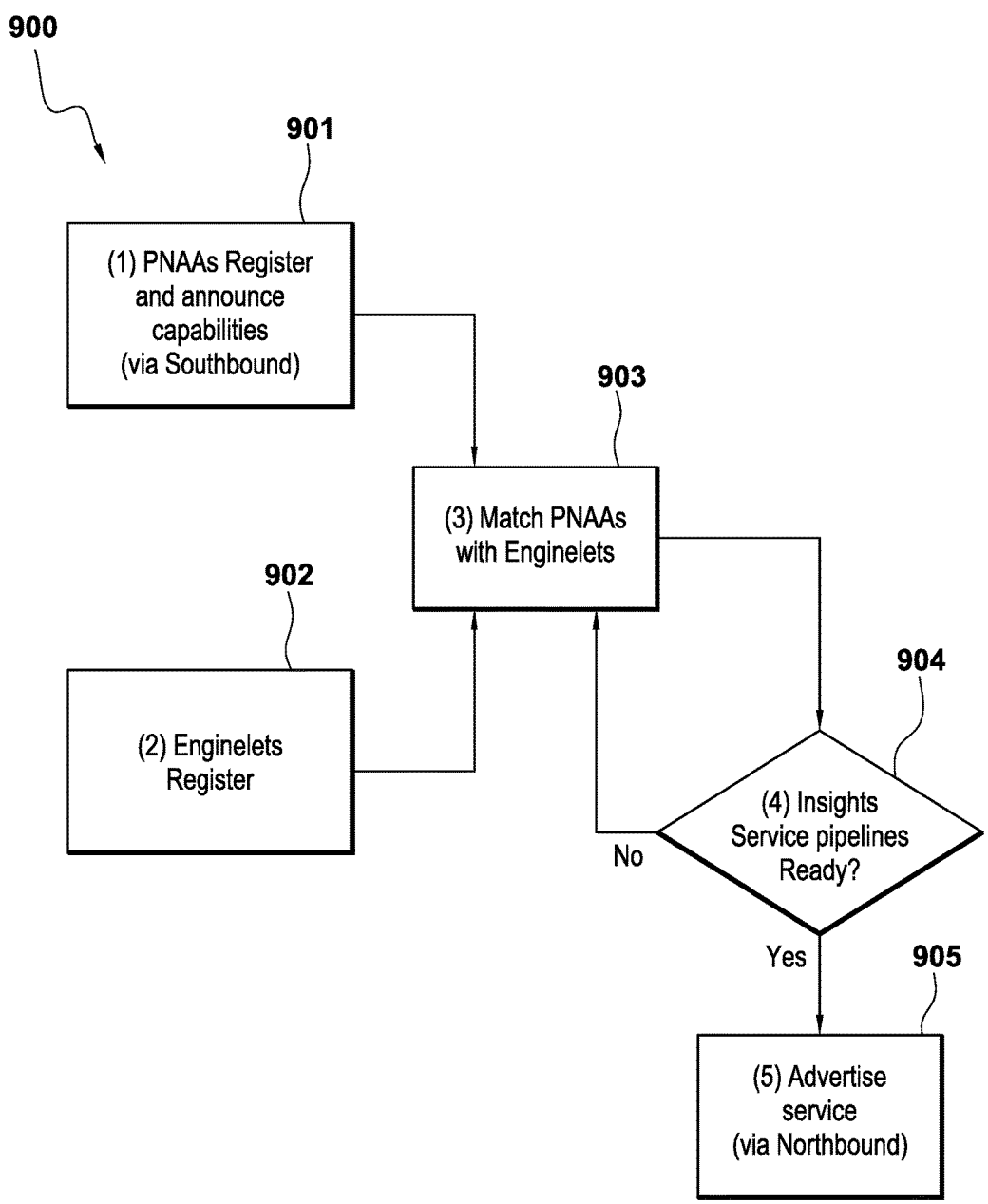
FIG. 9 is a flow chart for plug-and-play operations process.

FIG. 9 illustrates a flow chart for the PPF process 900. The PPF process 900 begins with step 901 where PNAAs 201 register with (announce itself and its capabilities to) the CAE 202. In the registration message, the PNAA 201 provides an identifier, as well as the list of known identifier prefixes of the enginelets 301 that understand syntax and semantics of the data digest streams produced by the PNAA 201.

The PPF process 900 also included the step 902 where enginelets 301 register with CAE 202. In the registration, each enginelets 301 may register one or more identifiers.

The PPF process 900 then proceeds to step 903 where the CAE 202 performs matching of the registered PNAA 201 and enginelet 301 identifiers to establish the matching of PNAAs 201 to the enginelets 301 that understand the format, syntax and semantics of the data sent by the PNAAs 201.

The PPF process 900 then proceeds to step 904 where the insights service availability criteria is checked, specifically that all the needed PNAAs 201 and enginelets 301 are present to provide the insights. If yes, then the corresponding service advertisement starts (FIG. 7, above).

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for performing programmable native analytics on a 5G mobile network node, the system comprising:
   a plurality of programmable native analytics agents on the 5G mobile network node configured to produce data digests by reducing, aggregating and binning source data; and
   a central analytics engine on the 5G mobile network node configured to determine which of the plurality of programmable native analytics agents to collect data digests from based on requested insight service,
   a southbound analytics interface configured to enable communication between the central analytics engine and each of the plurality of programmable native analytics agents, wherein
   the central analytics engine includes a plurality of enginelets which are configured to perform analytics on the data digests received by the central analytics engine based on the requested insight service, and
   the plurality of programmable native analytics agents are configured to be programmed and controlled by the central analytics engine by the southbound analytics interface.

2. The system of claim 1, further comprising a northbound analytics interface configured to enable communications between the central analytics engine and subscribers.

3. The system of claim 2, wherein the central analytics engine is configured to transmit the network insights to subscribers over the northbound analytics interface.

4. The system of claim 2, wherein the central analytics engine receives registration information over the northbound analytics interface for network insights.

5. The system of claim 1, wherein the plurality of programmable native analytics agents are native to virtual network functions which compose the 5G mobile network node.

6. The system of claim 1, wherein the programmable native analytics agents are configured to perform analytics on the source data.

7. The system of claim 1, wherein the programmable native analytics agents are programmable and extensible.

8. The system of claim 1, wherein the output of at least one of the plurality of enginelets is input into at least one of the plurality of enginelets.

9. The system of claim 1, wherein the central analytics engine generates network insights based on the analytics performed on the plurality of enginelets.

10. A method for performing programmable native analytics on a 5G mobile network node, the method comprising:
producing, by a plurality of programmable native analytics agents on the 5G mobile network node, data digests by reducing, aggregating and binning source data, and
determining, by a central analytics engine on the 5G mobile network node, which of the plurality of programmable native analytics agents to collect data digests from based on requested insight service,
enabling communication, by a southbound analytics interface, between the central analytics engine and each of the plurality of programmable native analytics agents, wherein
the central analytics engine includes a plurality of enginelets which are configured to perform analytics on the data digests received by the central analytics engine based on the requested insight service, and
the plurality of programmable native analytics agents are configured to be programmed and controlled by the central analytics engine by the southbound analytics interface.

11. The method of claim 10, further comprising enabling communications, by a northbound analytics interface, between the central analytics engine and subscribers.

12. The method of claim 11, wherein the central analytics engine is configured to transmit the network insights to subscribers over the northbound analytics interface.

13. The method of claim 11, wherein the central analytics engine receives registration information over the northbound analytics interface for network insights.

14. The method of claim 10, wherein the plurality of programmable native analytics agents are native to virtual network functions which compose the 5G mobile network node.

15. The method of claim 10, wherein the programmable native analytics agents are configured to perform analytics on the source data.

16. The method of claim 10, wherein the programmable native analytics agents are programmable and extensible.

17. The method of claim 10, wherein the output of at least one of the plurality of enginelets is input into at least one of the plurality of enginelets.

18. The method of claim 10, wherein the central analytics engine generates network insights based on the analytics performed on the plurality of enginelets.

* * * * *